US 8,635,593 B2
Jan. 21, 2014

(12) United States Patent
Giat

(54) DYNAMIC AUTOCOMPLETION TOOL

(75) Inventor: Hana Giat, Modi'in (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 1257 days.

(21) Appl. No.: 12/241,661

(22) Filed: Sep. 30, 2008

(65) Prior Publication Data
US 2010/0083225 A1 Apr. 1, 2010

Related U.S. Application Data

(60) Provisional application No. 61/052,767, filed on May 13, 2008.

(51) Int. Cl.
G06F 9/44 (2006.01)

(52) U.S. Cl.
USPC ............ 717/111; 717/115; 717/124; 717/131

(58) Field of Classification Search
None
See application file for complete search history.

(56) References Cited

U.S. PATENT DOCUMENTS

| | | | | |
|---|---|---|---|---|
| 6,367,068 | B1 * | 4/2002 | Vaidyanathan et al. | 717/143 |
| 7,434,205 | B1 * | 10/2008 | Steenhagen et al. | 717/124 |
| 7,562,344 | B1 * | 7/2009 | Allen et al. | 717/113 |
| 7,823,138 | B2 * | 10/2010 | Arguelles et al. | 717/131 |
| 7,937,688 | B2 * | 5/2011 | Vaidyanathan et al. | 717/111 |
| 8,171,452 | B2 * | 5/2012 | Crasovan et al. | 717/111 |
| 8,250,525 | B2 * | 8/2012 | Khatutsky | 717/111 |
| 2002/0066071 | A1 * | 5/2002 | Tien et al. | 717/102 |
| 2002/0184610 | A1 * | 12/2002 | Chong et al. | 717/109 |
| 2004/0034846 | A1 * | 2/2004 | Ortal et al. | 717/111 |
| 2005/0172270 | A1 * | 8/2005 | Dathathraya et al. | 717/124 |
| 2006/0184925 | A1 * | 8/2006 | Ficatier et al. | 717/163 |
| 2006/0225036 | A1 * | 10/2006 | Pandit et al. | 717/115 |
| 2007/0050728 | A1 * | 3/2007 | Vayssiere | 715/780 |
| 2007/0169004 | A1 * | 7/2007 | Prakash | 717/131 |
| 2007/0174814 | A1 * | 7/2007 | Komissarchik et al. | 717/115 |
| 2007/0240118 | A1 * | 10/2007 | Keren | 717/124 |
| 2008/0108682 | A1 * | 5/2008 | Petschen et al. | 514/397 |
| 2008/0235677 | A1 * | 9/2008 | Aniszczyk et al. | 717/165 |
| 2008/0270998 | A1 * | 10/2008 | Zambrana | 717/131 |
| 2008/0307391 | A1 * | 12/2008 | Goel | 717/115 |
| 2009/0158256 | A1 * | 6/2009 | Ponsford et al. | 717/125 |

OTHER PUBLICATIONS

Doug Toppin@gmail.com, The Eclipse IDE, Jan. 3, 2008, novalug-eclipse, p. 1-14.*
Prashant Deva, Create a commercial-quality Eclipse IDE, Part 3: Fine-tune the UI, 2006, p. 2-6.*
Maya Dobuzhskaya, Timeliner Integrated Development Environment, Massachusetts Institute of Technology, 2005, pp. 23-26 and 52-56.*
Wiliam Ryan, Web-Based Java Integrated Development Environment, University of Edinburgh Division of Informaties, 2007, pp. 15-20.*
Sun, Using the Identify Manager IDE, 2007, pp. 5-15.*

* cited by examiner

Primary Examiner — Thuy Dao
Assistant Examiner — Mongbao Nguyen

(57) ABSTRACT

In at least some embodiments, a computing device includes a processor and a system memory coupled to said processor. The system memory stores an integrated development environment (IDE) and a dynamic autocompletion tool. When executed by the processor, the IDE provides a script editor. When executed by the processor, the dynamic autocompletion tool analyzes real-time content of a user application being executed to populate an autocompletion list for use with the IDE application.

15 Claims, 4 Drawing Sheets

DYNAMIC AUTOCOMPLETION TOOL

CROSS REFERENCE TO RELATED APPLICATIONS

This Application claims the benefit of U.S. Provisional Application Ser. No. 61/052,767, filed 13 May 2008, titled "Dynamic Autocompletion Tool" which is hereby incorporated by reference herein as if reproduced in full below.

BACKGROUND

Integrated Development Environments (IDEs) provide various tools (e.g., a source code editor, a compiler, an interpreter, build automation tools and a debugger) for software development. In preparing code for IDEs, repeated use of static objects and/or arguments is common. To facilitate data entry, autocompletion tools that suggest repeated objects or arguments have been developed (e.g., sometimes referred to as "Intellisense" tools).

One example of an IDE is an automated functional testing tool (AFTT). For AFTTs, two types of test generation are used: "recording test generation" (RTG) and "manual test script generation" (MTSG). In RTG, a test script is created by executing an application and operating on the application. RTG facilitates test script generation because real-time data from the application can be used (e.g., selection of a item from a list). The drawback of RTG is that the created test script can be unreliable (e.g., recording does not account for multiple uses of a string in the same list). In MTSG, a test script is created by designing and entering the script. For MTSG, the created test script can be more reliable than RTG, but the creation process is long, tedious and error prone. Autocompletion tools have been used with MTSG to suggest static information for object operations and related arguments. Improved autocompletion tools for MTSG or other IDE applications would be desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to Integrated Development Environments (IDEs) that support dynamic autocompletion of script entries based on the real-time content of another application (e.g., a user application) being executed. As an example, the IDE may be an automated functional testing tool (AFTT) that uses the dynamic autocompletion feature to facilitate manual test script generation (MTSG). In at least some embodiments, object operations and related arguments of a test script can be suggested using the dynamic autocompletion feature.

Figure 1:
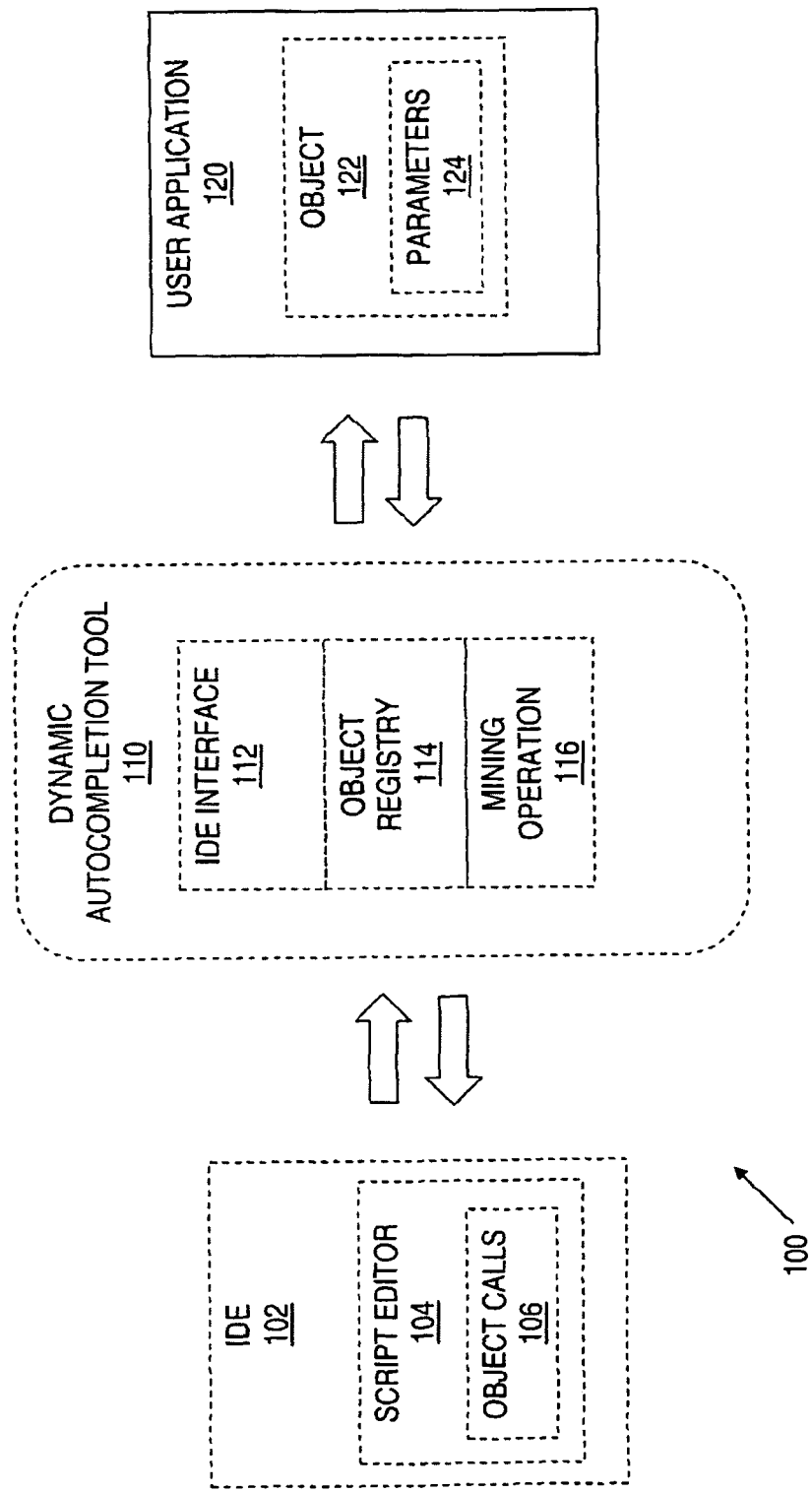
FIG. 1 shows a system in accordance with embodiments of the disclosure.

FIG. 1 shows a system 100 in accordance with embodiments of the disclosure. As shown, the system 100 comprises a dynamic autocompletion tool 110 in communication with an IDE 102 and a user application 120. The IDE 102 includes a script editor 104. In at least some embodiments, the IDE 102 comprises an AFTT with an MTSG feature.

When an object call 106 is entered in the script editor 104, the dynamic autocompletion tool 110 detects the object call 106 via the IDE interface 112. If the object call 106 is new, the dynamic autocompletion tool 110 registers a corresponding object identifier in an object registry 114. Before or after registry, the mining operation 116 searches a user application 120 for an object 122 corresponding to the object call 106. If the object 122 is found, the dynamic autocompletion tool 110 stores or updates relevant parameters 124 of the object 122 in the object registry 114. In at least some embodiments, the mining operation 116 involves a "learning" process in which the object 122 is located in the user application 120 and corresponding parameters 124 and/or an object identifier are stored in the object registry 114. Subsequently, if a corresponding object call 106 is entered in the script editor 104, the mining operation 116 involves an "update" process in which the parameters 124 of the object 122 are examined and updated during the real-time execution of the user application 120. In at least some embodiments, the parameters 124 comprise object operations and/or operation arguments.

In at least some embodiments, the components of the system 100 (i.e., the IDE 102, the dynamic autocompletion tool 110 and the user application 120) are executed on the same computing device. In alternative embodiments, the components of the system 100 are executed on separate computing device, which are networked together. Also, in different embodiments, the IDE 102 and the dynamic autocompletion tool 110 may be a single software package or separate software packages.

Figure 2:
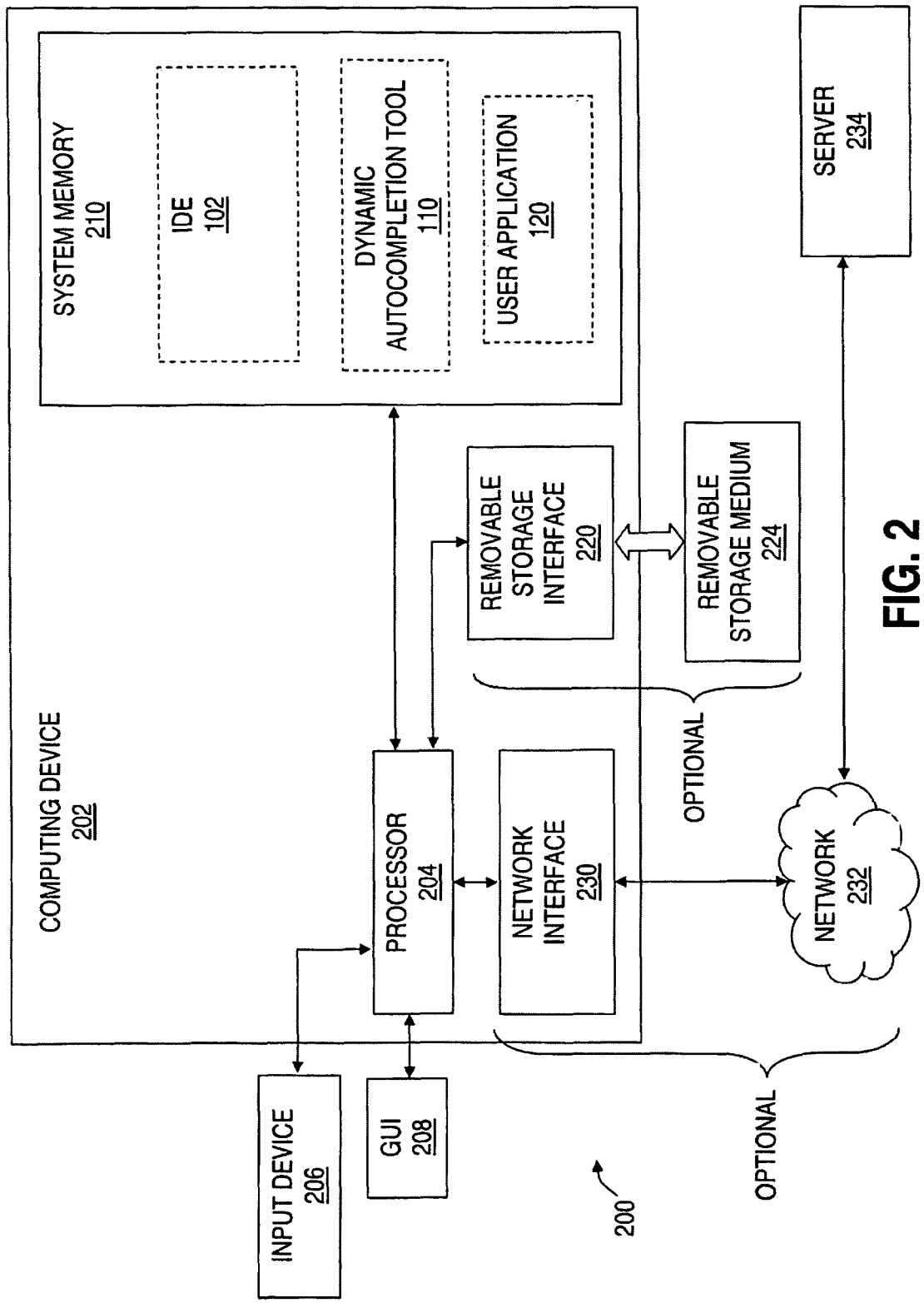
FIG. 2 shows a computing system in accordance with embodiments of the disclosure.

FIG. 2 shows a computing system 200 in accordance with embodiments of the disclosure. As shown, the computing system 200 comprises a computing device 202 (e.g., a desktop computer, a laptop computer, or a server) having at least one processor 204 and a system memory 210. The system memory 210 may be any suitable computer-readable medium which stores applications and/or instructions executable by the processor 204. For example, the system memory 210 may comprise volatile memory such as random access memory (RAM). Additionally or alternatively, the system memory 210 may comprise non-volatile memory such as a hard disk, a flash drive or an optical disk.

In the embodiment of FIG. 2, the system memory 110 stores the IDE 102, the dynamic autocompletion tool 110 and the user application 120 described for FIG. 1. In alternative embodiments, at least one of these software components is accessed from a removable storage medium 224 (e.g., an optical disk or a flash drive) via an optional removable storage interface 220. Additionally or alternatively, at least one of the software components is accessed from a server 234 on a network 232 via an optional network interface 230.

When executed (e.g., by the processor 204), the IDE 102 provides a script editor that enables a user to enter (e.g., type) a script via an input device 206 coupled to the processor 204. The input device 206 represents, for example, a keyboard, a mouse and/or other devices that enable a user to interact with the computing device 202. In accordance with some embodiments, at least one corresponding script editor window may be displayed via a graphic user interface (GUI) 208 coupled to the processor 204. In the case where the IDE 104 corresponds to an AFTT with a MTSG, the script editor corresponds to a test script editor and the application 120 corresponds to an application under test (AUT). Accordingly, the test script editor and/or the AUT may be displayed via the GUI 208.

When executed (e.g., by the processor 204), the dynamic autocompletion tool 110 uses the mining operation 116 previously described to analyze the real-time content of the user application 120. For example, the mining operation 116 may uniquely identify user application objects related to object calls in a script editor 104 of the IDE 102. Once a user application object has been identified (or "learned"), the mining operation 116 can access the object in real-time to retrieve related content (e.g., parameters, object operations, arguments or other properties). In some embodiments, the description of each user application object is hierarchical from the top-level window to the object itself (i.e., the object is uniquely identified system-wide). As an example, the object Window("xx").Button("yy") would differ from the object. Window("xxxxx"). Button("yy").

In at least some embodiments, the IDE's script editor supports various types of control, each represented by an object having relevant properties and operations. As an example, one type of control for a script editor may be a "List" object that defines the operations "Select" and "ExtendSelect." In such case, the dynamic autocompletion tool 110 may perform the mining operation 116 to suggest relevant operations and/or arguments for a specific list of the user application 120. In the case where an operation argument is not defined with a static list of possible values (e.g., when ON/OFF are the only possible values), the dynamic autocompletion tool 110 performs the mining operation 116 on the user application 120 to suggest, for example, all the selectable items upon editing arguments for a Select-operation.

Figure 3:
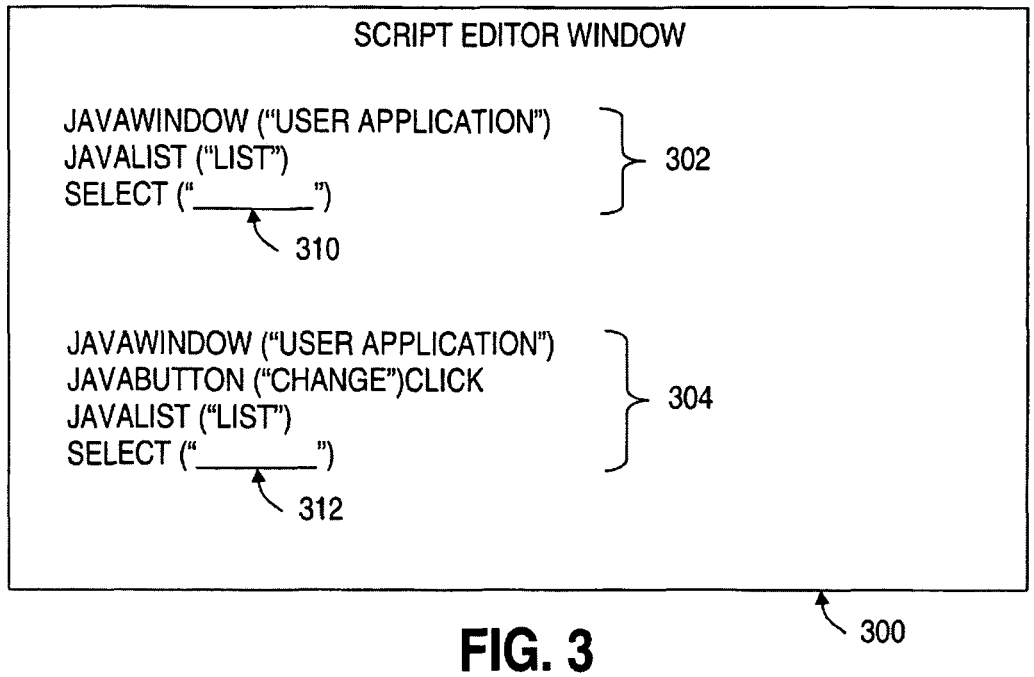
FIG. 3 shows a script editor window in accordance with embodiments of the disclosure.

FIG. 3 shows a script editor window 300 in accordance with embodiments of the disclosure. In at least some embodiments, the script editor window 300 may be for MTSG. In FIG. 3, a script having dialogues 302 and 304 is shown in the script editor window 300. The dialogue 302 comprises a "User Application" command, which executes the user application 120. The dialogue 302 further comprises a "List" object command. As previously described, the List object defines the operations "Select" and "ExtendSelect." Thus, when the operation "Select" is entered, the dynamic autocompletion tool 110 suggests relevant arguments for the Select operation in the space 310 based on real-time content of the user application 120.

The dialogue 304 also comprises the "User Application" command. In order to change the content of the List object, the dialogue 304 comprises a "Change" command and click operation, which corresponds to the user application 120 as will be described for FIG. 4. Subsequently, the dialogue 304 comprises a "List" object command. When the "Select" operation is entered, the dynamic autocompletion tool 110 examines the real-time content of the user application 120 and provides relevant arguments for the Select operation in the space 312. In FIG. 3, various commands of the script editor are shown as being Java-based. Additionally or alternatively, script editor commands may correspond to Web commands, Windows commands, Delphi commands, Visual Basic commands, .Net commands or other suitable script editor protocols.

Figure 4:
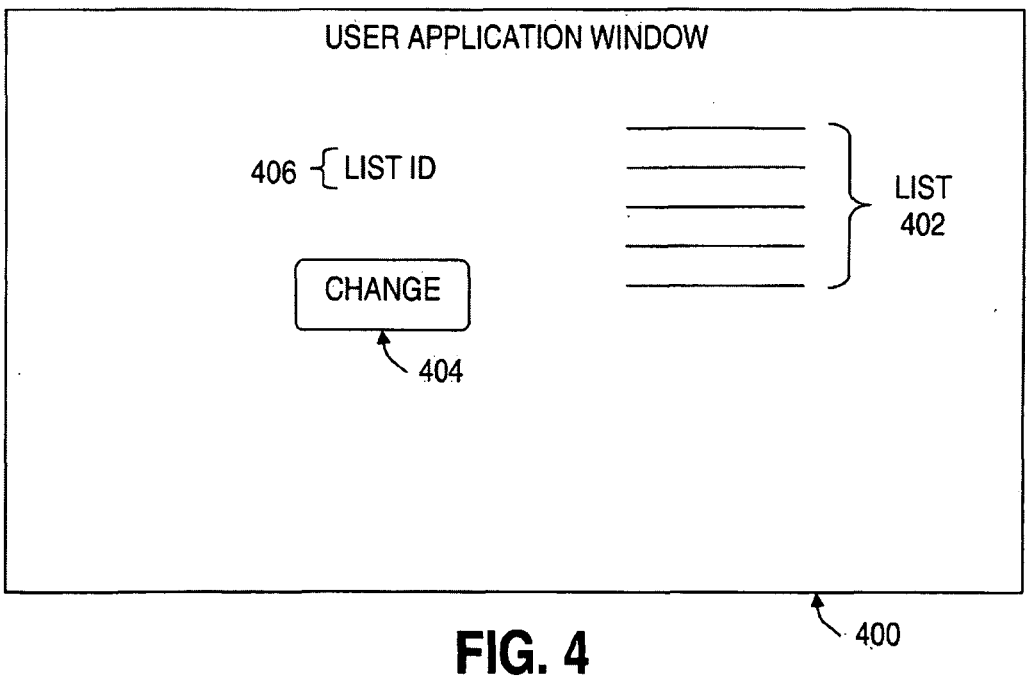
FIG. 4 shows a user application window in accordance with embodiments of the disclosure.

FIG. 4 shows a user application window 400 in accordance with embodiments. For example, if the IDE 102 corresponds to an AFTT, the user application 120 may be an AUT with the window 400. In general, the user application 120 contains content such as user application objects (e.g., Comboboxes, Lists, Trees, Menus, Toolbars or other objects). In the embodiment of FIG. 4, the user application window 400 comprises a list 402. By entering the List command and the Select operation in the script editor as described previously, the items in the list 402 are dynamically accessed for use with the script editor (e.g., to fill in the spaces 310 and 312).

In at least some embodiments, the user application window 400 also comprises a list identifier (ID) 304 that identifies the genre or category of the items in the list 402 (e.g., by name, question, or other identifier). The user application window 400 also comprises a change button 406 that, when clicked, switches between different sets of lists (i.e., the content of the user application 120 is dynamic). The dialogue 304 in FIG. 3 illustrates that the script editor can be used to control the user application 120 by clicking the change button 406 (using the "Change" command and "click" operation). Subsequently, the List command and Select operation will obtain the real-time content of the user application 120 to fill in the space 312.

Figure 5:
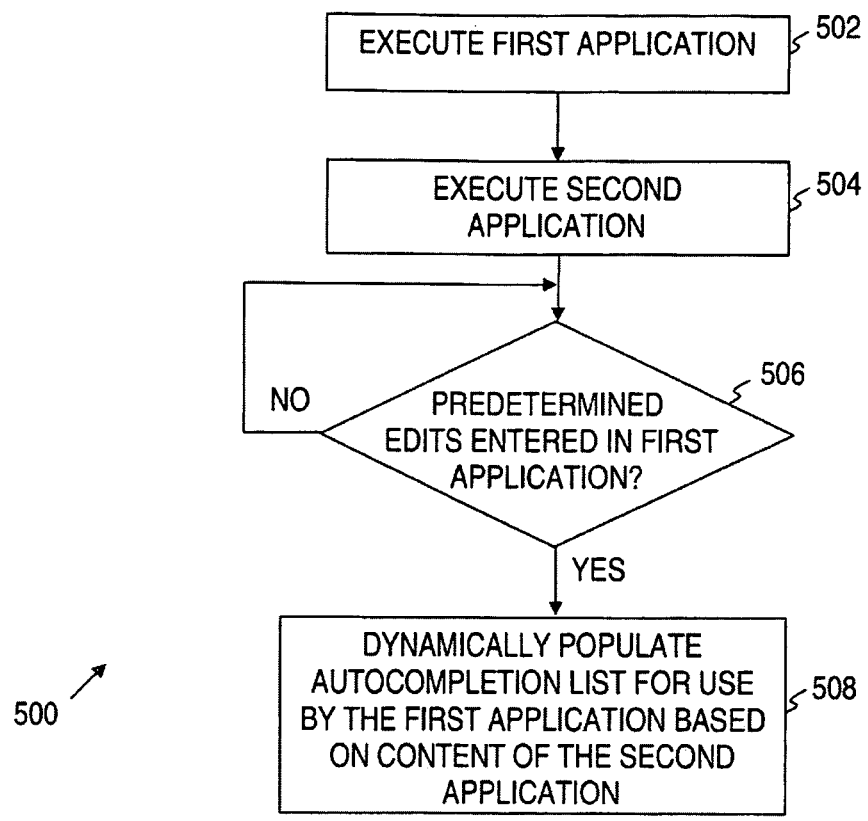
FIG. 5 shows a method in accordance with embodiments of the disclosure.

FIG. 5 shows a method 500 in accordance with embodiments of the disclosure. As shown, the method 500 comprises executing a first application (block 502). For example, the first application may be an IDE such as an AFT or other IDE having a script editor for MTSG. At block 504, a second application is executed. The second application may correspond to a user application. If predetermined edits are entered for the first application (determination block 506), an autocompletion list is dynamically populated for use by the first application based on content of the second application (block 508). In at least some embodiments, the autocompletion list is related to object operations and/or arguments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    executing a first application;
    executing a second application;
    executing a dynamic autocompletion tool; and responsive to a predetermined edit being entered in the first application, dynamically populating an autocompletion list for use with the first application based on real-time content of the second application extracted from the second application by the autocompletion tool during execution of the second application.

2. The method of claim 1 further comprising detecting an object call in a script editor of the first application and examining content of the second application to register an object identifier and object parameters related to the object call.

3. The method of claim 1 further comprising accessing the autocompletion list based on a list object command and a select operation command associated with the list object command.

4. The method of claim 1 further comprising changing between different autocompletion lists based on a change command, a list object command, and a select operation command associated with the list object command.

5. A non-transitory computer-readable medium that stores an Integrated Development Environment (IDE) application, when executed, the IDE application causes a processor to:

execute a first application;
execute a second application;
execute a dynamic autocompletion tool; and
dynamically populate an autocompletion list for use with the first application based on real-time content extracted from the second application by the dynamic autocompletion tool during the execution of the second application.

6. The computer-readable medium of claim 5 wherein the IDE application further causes the processor to apply the autocompletion list to manual test script generation (MTSG) of an automated functional testing tool (AFTT).

7. The computer-readable medium of claim 5 wherein the IDE application further causes the processor to apply the autocompletion list to an object operation.

8. The computer-readable medium of claim 5 wherein the IDE application further causes the processor to apply the autocompletion list to an operation argument associated with an object.

9. A computing system, comprising:

a processor;
a system memory coupled to said processor;
wherein the system memory stores an integrated development environment (IDE) and a dynamic autocompletion tool,
when executed by the processor, the IDE provides a script editor,
when executed by the processor, the dynamic autocompletion tool analyzes real-time content of a user application being executed to populate an autocompletion list for use with the script editor.

10. The computing system of claim 9 wherein the IDE comprises an automated functional testing tool (AFTT).

11. The computing system of claim 9 wherein the dynamic autocompletion tool is separate from the IDE.

12. The computing system of claim 9 wherein the dynamic autocompletion tool is accessed via a removable storage medium.

13. The computing system of claim 9 wherein the dynamic autocompletion tool is accessed via a network connection.

14. The computing system of claim 9 wherein the user application comprises a dynamic list.

15. The computing system of claim 14 wherein the user application supports a list change operation that switches between different sets of lists.

* * * * *